US006643104B2

(12) United States Patent
Shimazawa (10) Patent No.: US 6,643,104 B2
(45) Date of Patent: Nov. 4, 2003

(54) MAGNETORESISTIVE EFFECT THIN-FILM MAGNETIC HEAD

(75) Inventor: Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 180 days.

(21) Appl. No.: 09/899,857

(22) Filed: Jul. 9, 2001

(65) Prior Publication Data

US 2002/0030946 A1 Mar. 14, 2002

(30) Foreign Application Priority Data

Jul. 10, 2000 (JP) ........................................ 2000-208400

(51) Int. Cl.[7] ............................. G11B 5/60; G11B 5/10
(52) U.S. Cl. ...................................................... 360/319
(58) Field of Search ........................... 360/319, 324.11, 360/324.2, 234.5, 322

(56) References Cited

U.S. PATENT DOCUMENTS

| 5,296,982 A | * | 3/1994 | Terada et al. | 360/234.5 |
| 5,668,688 A | * | 9/1997 | Dykes et al. | 360/324.1 |
| 5,726,837 A | * | 3/1998 | Nakatani et al. | 360/324.2 |
| 6,385,012 B1 | * | 5/2002 | Sasaki | 360/234.5 |
| 6,487,044 B1 | * | 11/2002 | Honda | 360/234.5 |

FOREIGN PATENT DOCUMENTS

JP 04103014 4/1992

OTHER PUBLICATIONS

W.P. Pratt, Jr., et al., "Perpendicular Giant Magnetoresistance of Ag/Co Multilayers", Physical Review Letters, vol. 66, No. 23, Jun. 10, 1991, pp. 3060–3063.

* cited by examiner

Primary Examiner—George J. Letscher
Assistant Examiner—Christopher R Beacham
(74) Attorney, Agent, or Firm—Burns, Doane, Swecker & Mathis, L.L.P.

(57) ABSTRACT

An MR thin-film magnetic head includes a lower shield layer, an upper shield layer, a MR multilayer sandwiched between the lower shield layer and the upper shield layer, the MR multilayer being electrically connected with the lower shield layer and the upper shield layer, a current flowing through the MR multilayer in a direction perpendicular to surfaces of layers, and a lead conductor having one end electrically connected to the upper shield layer and the other end connected to a terminal electrode. The lead conductor is patterned such that an area of said lead conductor located above said lower shield layer becomes small.

16 Claims, 10 Drawing Sheets

MAGNETORESISTIVE EFFECT THIN-FILM MAGNETIC HEAD

FIELD OF THE INVENTION

The present invention relates to a magnetoresistive effect (MR) thin-film magnetic head that is applicable to a hard disk drive (HDD) apparatus and provided with a tunnel magnetoresistive effect (TMR) element or a current perpendicular to the plane giant magnetoresistive effect (CPP-GMR) element, in which a current flows in a direction perpendicular to surfaces of layers.

DESCRIPTION OF THE RELATED ART

Recently, in order to satisfy the demand for higher recording density in an HDD apparatus, higher sensitivity and larger output of a thin-film magnetic head are required. A TMR element and a CPP-GMR element meet these requirements and are beginning to receive attention. The TMR element, disclosed in Japanese patent publication No. 04103014A for example, utilizes a ferromagnetic tunnel effect and has a multi-layered structure including a lower ferromagnetic thin-film layer, a tunnel barrier layer and an upper ferromagnetic thin-film layer. The CPP-GMR element is one type of GMR element Of a multi-layered structure including a lower ferromagnetic thin-film layer, a nonmagnetic metal layer and an upper ferromagnetic thin-film layer. In the CPP-GMR element, however, a current flows in a direction perpendicular to the surfaces of laminated layers. Such CPP-GMR element is disclosed in, for example, W. P. Pratt, Jr. et al., "Perpendicular Giant Magnetoresistance of Ag/Co Multilayer," PHYSICAL REVIEW LETTERS, Vol. 66, No. 23, pp.3060–3063, June 1991.

These elements not only offer MR ratios several times greater than that of a general GMR element such as CIP (Current-In-Plane)-GMR element in which a current flows along the surface of layers, but also implements narrow gaps between layers without difficulty. The terms "lower" in "lower ferromagnetic thin-film layer" and "upper" in "upper ferromagnetic thin-film layer" are selectively used depending on the position of the layer relative to the substrate. In general, a layer is "lower" if this layer is close to the substrate, and "upper" if the layer is away from the substrate.

Figure 1:
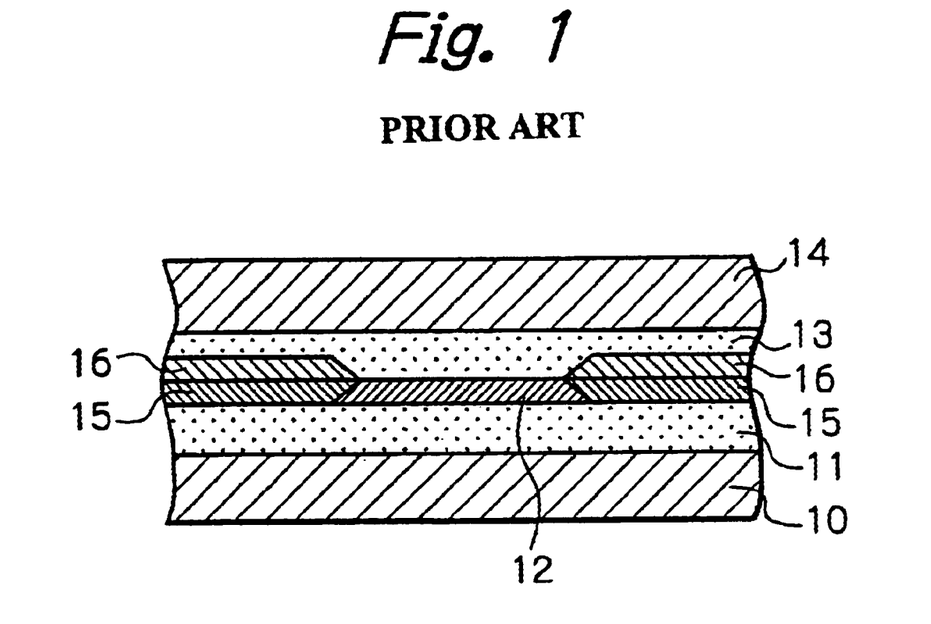
FIG. 1 already disclosed shows a sectional view illustrating a CIP-GMR element with a conventional structure seen from a direction of ABS.

FIG. 1 illustrates a CIP-GMR element with a conventional structure seen from an air bearing surface (ABS).

In the figure, reference numeral 10 denotes a lower shield layer, 11 denotes a lower shield gap layer made of an insulation material, 12 denotes a GMR multilayer consisting of a lower ferromagnetic thin-film layer (free layer)/a nonmagnetic metal layer/an upper ferromagnetic thin-film layer (pinned layer)/an anti-ferromagnetic thin-film layer, 13 denotes an upper shield gap layer formed of an insulation material, 14 denotes an upper shield layer, 15 denotes hard bias layers, and 16 denotes electrode layers, respectively.

A sense current flows in parallel to the surfaces of the layers of the GMR multilayer 12. The GMR multilayer 12 are insulated from the lower shield layer 10 by the lower shield gap layer 11, and from the upper shield layer 14 by the upper shield gap layer 13.

In order to more narrow the gap of such CIP-GMR element, the lower and upper shield gap layers 11 and 13 require to be formed of a very thin insulating material with a very high dielectric strength. However, such an insulating material is difficult to make and has been the bottleneck for providing a CIP-GMR element used in a high density HDD apparatus.

Figure 2:
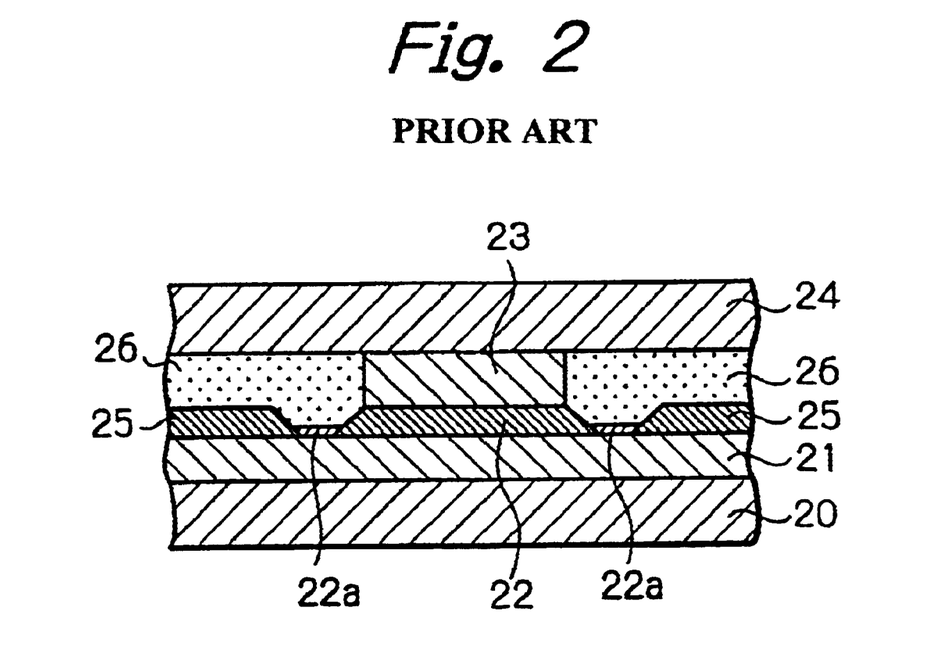
FIG. 2 already disclosed shows a sectional view illustrating a TMR element or a CPP-GMR element with a conventional structure seen from a direction of ABS.

FIG. 2 illustrates a TMR element or a CPP-GMR element with a conventional structure, seen from the ABS.

In the figure, reference numeral 20 denotes a lower shield layer also serving as an electrode, 21 denotes a lower gap layer made of a metal material, which also serves as an electrode, 22 denotes a TMR layer with a multi-layered structure consisting of a lower ferromagnetic thin-film layer (free layer)/a tunnel barrier layer/an upper ferromagnetic thin-film layer (pinned layer)/an anti-ferromagnetic thin-film layer, or CPP-GMR layer with a multi-layered structure consisting of a lower ferromagnetic thin-film layer (free layer)/a nonmagnetic metal layer/an upper ferromagnetic thin-film layer (pinned layer)/an anti-ferromagnetic thin-film layer, 23 denotes an upper gap layer made of a metal material, which also serves as an electrode, 24 denotes an upper shield layer also serving as an electrode, 25 denotes hard bias layers, and 26 denotes an insulation gap layer made of an insulating material, respectively. Reference numeral 22a denotes extended parts of the lower ferromagnetic thin-film layer (free layer) extending from the TMR multilayer or the CPP-GMR multilayer to the hard bias layers 25 along the surfaces of layers of the TMR multilayer or the CPP-GMR multilayer.

The TMR element or CPP-GMR element is electrically connected between the lower shield layer 20 and the upper shield layer 24 so that a sense current flows in a direction perpendicular to the surfaces of the layers. Therefore, a narrow gap can be implemented without inviting dielectric breakdown of the gap layer. As a result, the line recording density can be greatly improved.

The important features required for an HDD apparatus are not only high recording density but also high data transfer rate. The transfer rate greatly relies on the rotational speed of a magnetic disk as well as the frequency characteristics of a write head and a read head.

Figure 3:
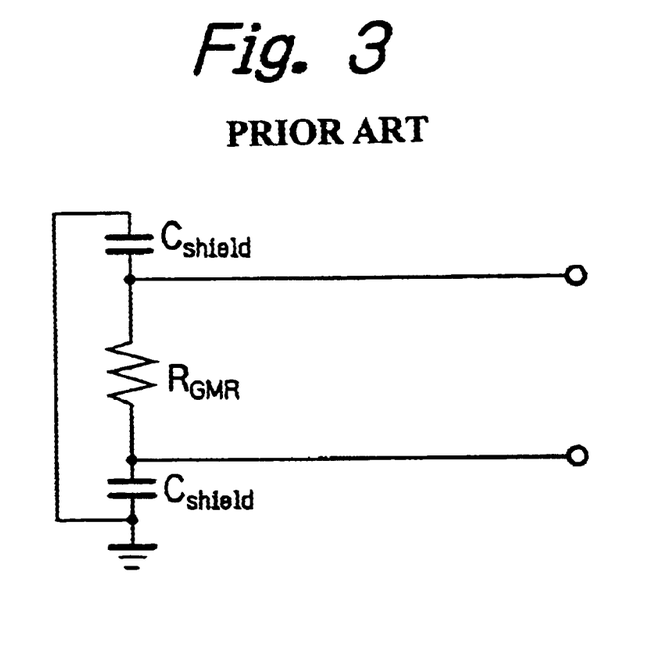
FIG. 3 already disclosed shows an equivalent circuit diagram of the CIP-GMR element.
Figure 4:
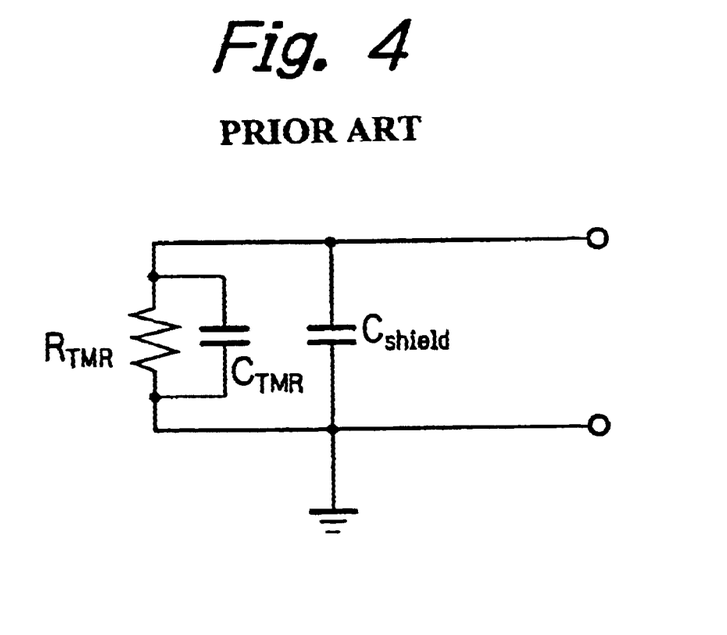
FIG. 4 already disclosed shows an equivalent circuit diagram of the TMR element or the CPP-GMR element.

FIG. 3 shows an equivalent circuit of the CIP-GMR element, and FIG. 4 shows an equivalent circuit of the TMR element or the CPP-GMR element.

As is apparent from FIG. 3, the CIP-GMR element has only an equivalent resistance $R_{GMR}$ of the GMR element across the output terminals and no other essential factor that may deteriorate its frequency characteristics. However, as shown in FIG. 4, the TMR element or the CPP-GMR element that utilizes the shield layers as the electrodes has not only an equivalent resistance $R_{TMR}$ of the TMR element or the CPP-GMR element across their output terminals but also a capacitance $C_{shield}$ between the shield layers and a capacitance $C_{TMR}$ of the TMR element or the CPP-GMR element itself across their output terminals. These resistance $R_{TMR}$ and capacitances $C_{TMR}$ and $C_{shield}$ form a low-pass filter causing serious deterioration of the frequency characteristics.

SUMMARY OF THE INVENTION

It is therefore an object of the present invention to provide an MR thin-film magnetic head having a TMR element or a CPP-GMR element for example, whereby the frequency characteristics of the MR thin-film magnetic head can be greatly improved.

According to the present invention, an MR thin-film magnetic head includes a lower shield layer, an upper shield layer, a MR multilayer sandwiched between the lower shield layer and the upper shield layer, the MR multilayer being electrically connected with the lower shield layer and the upper shield layer, a current flowing through the MR multilayer in a direction perpendicular to surfaces of layers, and a lead conductor having one end electrically connected to the upper shield layer and the other end connected to a terminal electrode. The lead conductor is patterned such that an area of the lead conductor located above the lower shield layer becomes small.

Also, according to the present invention, an MR thin-film magnetic head includes a lower shield layer, a lower gap layer made of a nonmagnetic electrically conductive material and laminated on the lower shield layer, an MR multilayer in which a current flows in a direction perpendicular to surfaces of layers of the MR multilayer, the MR multilayer being formed on the lower gap layer, an upper gap layer made of a nonmagnetic electrically conductive material and formed on the MR multilayer, an insulation gap layer made of an insulation material and formed to surround the MR multilayer and the upper gap layer, an upper shield layer laminated on the upper gap layer and the insulation gap layer, a lead conductor having one end electrically connected to the lower shield layer, and a terminal electrode electrically connected the other end of the lead conductor. The lead conductor is patterned such that an area of the lead conductor located above the lower shield layer becomes small.

Because the lead conductor is patterned such that an area of the lead conductor located above the lower shield layer becomes small, the capacitance $C_{shield}$ between the lower shield layer and the upper shield layer decreases. This improves the frequency characteristics of the thin-film magnetic head greatly.

Figure 5:
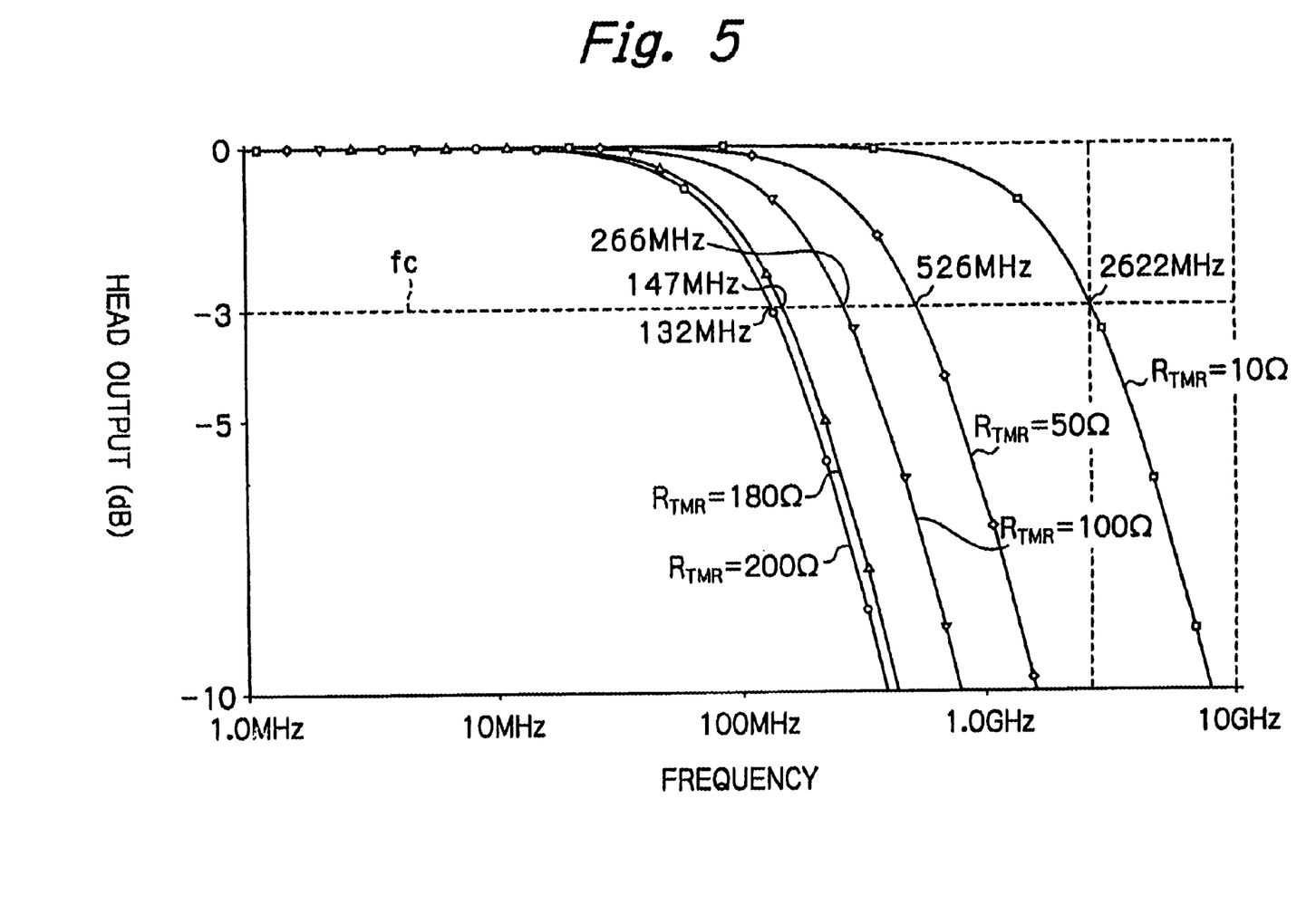
FIG. 5 already disclosed illustrates an attenuation versus frequency characteristic when the capacitance $C_{shield}$ between the shield layers in the equivalent circuit of FIG. 4 is 6 pF.
Figure 6:
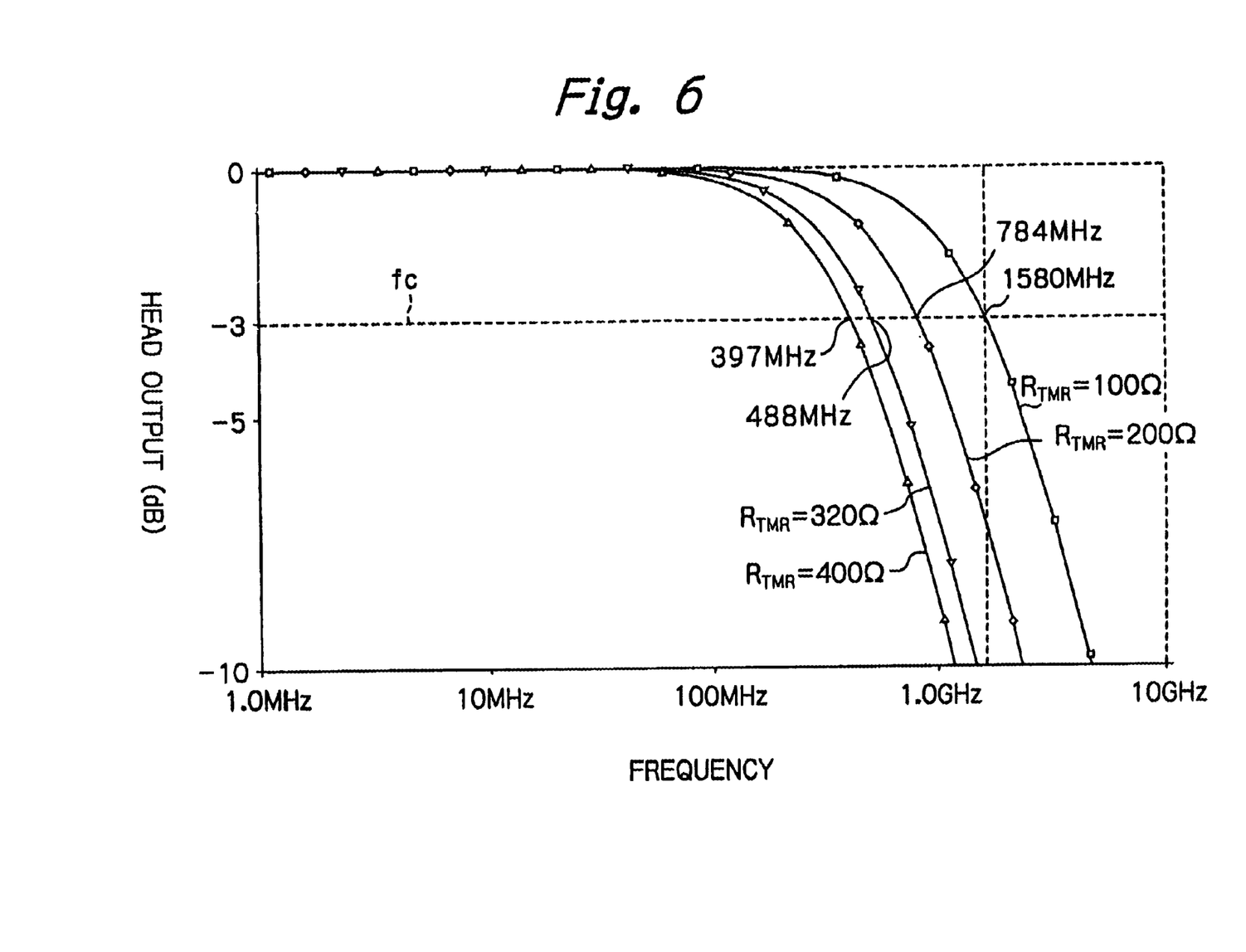
FIG. 6 already disclosed illustrates an attenuation versus frequency characteristic when the capacitance $C_{shield}$ between the shield layers in the equivalent circuit of FIG. 4 is 1 pF.

FIG. 5 illustrates a head output versus frequency characteristic when the capacitance $C_{shield}$ between the shield layers in the equivalent circuit of FIG. 4 is 6 pF, and FIG. 6 illustrates a head output versus frequency characteristic when the capacitance $C_{shield}$ between the shield layers in the equivalent circuit of FIG. 4 is 1 pF. It is assumed that the capacitance $C_{TMR}$ of the TMR element or CPP-GMR element itself is 0.01 pF and the load connected across the output terminals is 10 MΩ.

As will be understood from FIG. 5, when the capacitance $C_{shield}$ between the shield layers is 6 pF, the cut-off frequency fc at which the output decreases by 3 dB decreases as the resistance $R_{TMR}$ increases. In order to achieve fc>500 MHz, the resistance $R_{TMR}$ should be less than 50 Ω. This frequency of 500 MHz is an expected frequency to be used at a record density of about 100 Gbits/in$^2$. For TMR or CPP-GMR elements with a recording density of 100 Gbits/in$^2$ or more, it is very difficult to implement such a low resistance value.

Contrary to this, as shown in FIG. 6, when the capacitance $C_{shield}$ between the shield layers is 1 pF, even if the resistance $R_{TMR}$ is higher than 300 Ω, the cut-off frequency fc can be fc>500 MHz. For the resistance $R_{TMR}$ higher than 300 Ω that is a sufficiently realizable value, the frequency characteristic of the thin-film magnetic head can be greatly improved by making the capacitance $C_{shield}$ between the shield layers smaller. The capacitance $C_{TMR}$ of the TMR element or CPP-GMR element itself is much smaller than the capacitance $C_{shield}$ between the shield layers (less than one tenth), and therefore can be of little or no problem.

It is preferred that the lead conductor includes a via hole conductor formed outside of the lower shield layer. In this manner, the via hole conductor having the same potential as the upper shield layer is formed outside of the low shield layer. Thus, the via hole conductor of a large area does not become an opposite electrode of the capacitance between shield layers. This reduces the capacitance $C_{shield}$ between the shield layers greatly. Conventionally, forming of a lower shield layer results in a stepped portion around it. Therefore, it has been a common practice that not only the via hole conductor electrically connected to the lower shield layer but also the via hole conductor electrically connected to the upper shield layer are formed within a region of the lower shield layer. Instead, performing the CMP (chemical mechanical polishing) process after the lower shield layer is formed and an insulation layer is formed thereon can effectively eliminate the stepped portion caused by the lower shield layer. Thus, the via hole conductor may be easily formed at a position outside the lower shield layer.

It is also preferred that the whole of the lead conductor is formed outside of the lower shield layer.

The MR multilayer is preferably a TMR multilayer including a tunnel barrier layer and a pair of ferromagnetic thin-films between which the tunnel barrier is sandwiched, or a CPP-GMR multilayer including a nonmagnetic metal layer, and a pair of ferromagnetic thin-films between which the nonmagnetic metal layer is sandwiched.

Further objects and advantages of the present invention will be apparent from the following description of preferred embodiments of the invention as illustrated in the accompanying drawings.

DESCRIPTION OF THE PREFERRED EMBODIMENTS

Figure 7:
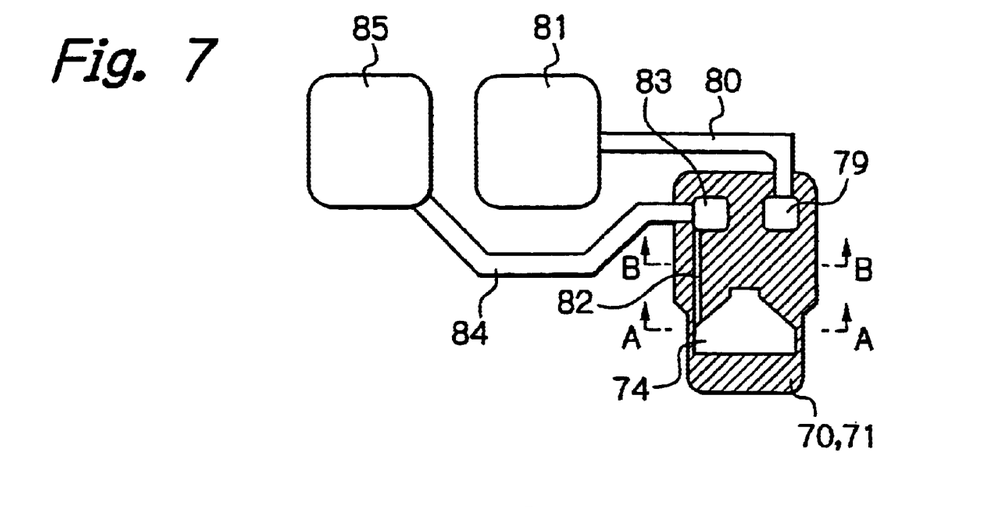
FIG. 7 shows a plane view schematically illustrating, as a first embodiment according to the present invention, a configuration of a lower shield layer, an upper shield layer and lead conductors of a TMR thin-film magnetic head.
Figure 8:
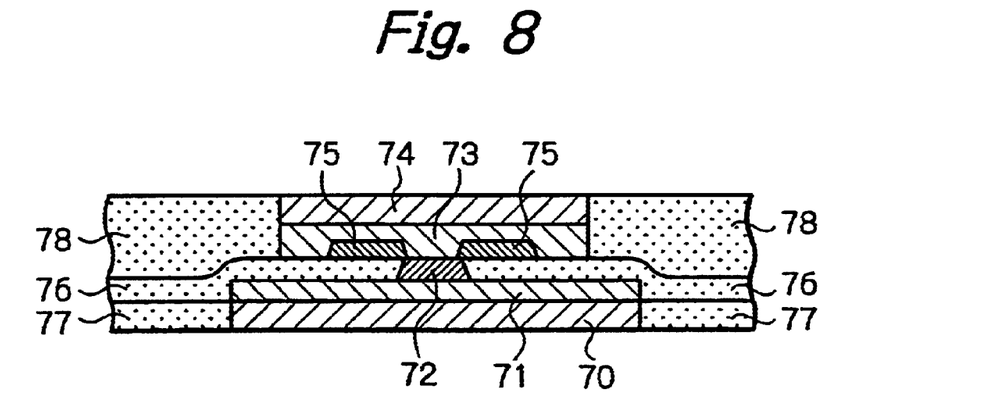
FIG. 8 shows an A—A line sectional view of FIG. 7.
Figure 9:
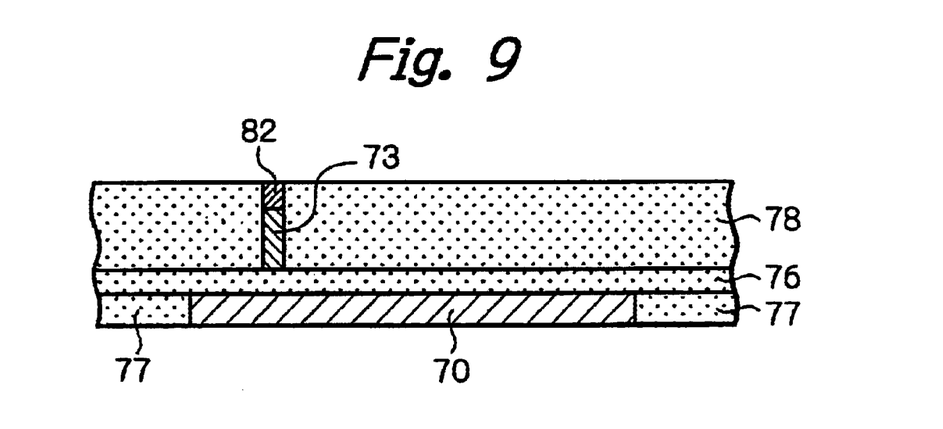
FIG. 9 shows a B—B line sectional view of FIG. 7.

FIG. 7 schematically illustrates an outline of the configuration of a lower shield layer, an upper shield layer, and lead conductors of a TMR thin-film magnetic head before MR height or throat height polishing as a first embodiment according to the present invention, FIG. 8 illustrates an A—A line section of FIG. 7, and FIG. 9 illustrates a B—B line section of FIG. 7.

In FIG. 7, only the lower shield layer, the upper shield layer, the lead conductors connected to the lower shield layer and upper shield layer, and terminal electrodes are shown, but the rest of the structure are omitted. In FIGS. 8 and 9, layers laminated on the upper surface of the upper shield layer are omitted.

Referring to these figures, reference numeral 70 denotes a lower shield layer also serving as an electrode, laminated on a substrate, not shown, 71 denotes a lower gap layer serving also as an electrode, made of a nonmagnetic electrically conductive material, that is laminated on the lower shield layer 70 and is electrically connected with the lower shield layer 70, 72 denotes a TMR multilayer laminated on the lower gap layer 71 and patterned, 73 denotes an upper gap layer also serving as an electrode, made of a nonmagnetic electrically conductive material, this upper gap layer being laminated at least on the TMR multilayer 72, 74 denotes an upper shield layer also serving as an electrode, that is laminated on the upper gap layer 73 and is electrically connected with the upper gap layer 73, 75 denotes hard bias layers for providing a bias magnetic field for magnetic domain control, 76 denotes an insulation gap layer made of an insulating material, that is formed on the lower gap layer 71 and outside of the TMR multilayer 72, 77 denotes a first insulation layer formed outside of the lower shield layer 70, and 78 denotes a second insulation layer formed on the insulation gap layer 76 outside of the upper gap layer 73 and the upper shield layer 74, respectively.

In FIG. 7, furthermore, reference numeral 79 denotes a first via hole conductor, one end of which is electrically connected to the lower shield layer 70 or the lower gap layer 71, 80 denotes a first lead conductor, one end of which is electrically connected to the other end of the first via hole conductor 79, 81 denotes a first terminal electrode (connection pad) to which the other end of the first lead conductor 80 is electrically connected, 82 denotes a second lead conductor, one end of which is electrically connected to the upper shield layer 74, 83 denotes a second via hole conductor, one end of which is electrically connected to the other end of the second lead conductor 82, 84 denotes a third lead conductor, one end of which is electrically connected to the other end of the second via hole conductor 83, and 85 denotes a second terminal electrode (connection pad) to which the other end of the third lead conductor 84 is electrically connected, respectively.

The TMR multilayer 72 has a multi-layered structure including at least essential layers such as an anti-ferromagnetic thin-film layer, a lower ferromagnetic thin-film layer (pinned layer), a tunnel barrier layer and an upper ferromagnetic thin-film layer (free layer), not shown in the figure.

The upper ferromagnetic thin-film layer (free layer) is formed basically such that the direction of magnetization freely changes depending upon an applied external magnetic field. The lower ferromagnetic thin-film layer (pinned layer) is formed such that the direction of magnetization is fixed to a desired orientation according to an exchange coupling bias magnetic field between the lower ferromagnetic thin-film layer and the anti-ferromagnetic thin-film layer.

The lower shield layer 70 and the upper shield layer 74 are formed in a single layer structure or a multilayer structure of, for example, NiFe (permalloy), sendust, CoFe, CoFeNi or CoZrNb. A film thickness is in the range of 0.5 to 4 $\mu$m, preferably 1 to 3 $\mu$m.

The lower gap layer 71 and the upper gap layer 73 are made of a nonmagnetic electrically conductive material such as Ta, Cu, Al, Ag, Au, Ti, TiW, Rh, Cr, In, Ir, Mg, Ru, W, Zn, PtMn or RuRhMn, or alloys of these materials. A film thickness is in the range of 5 to 70 nm, preferably 10 to 50 nm.

The lower ferromagnetic thin-film layer (pinned layer) and the upper ferromagnetic thin-film layer (free layer) of the TMR multilayer 72 are preferably made of a high spin polarization material, and are formed in a single layer structure or a multilayer structure of, for example, Fe, Co, Ni, CoFe, NiFe, CoZrNb or CoFeNi. The lower ferromagnetic thin-film layer (pinned layer) has a thickness in the range of 1 to 10 nm, preferably 2 to 5 nm. Too large thickness of the pinned layer weakens the exchange coupling bias magnetic field between this layer and the anti-ferromagnetic thin-film layer, and too small thickness reduces TMR ratio. A thickness of the upper ferromagnetic thin-film layer (free layer) is in the range of 2 to 50 nm, preferably 4 to 30 nm. If the thickness of the free layer is too large, the output of the head decreases and becomes unstable due to, for example, Barkhausen noise. If the thickness is too small, the output decreases due to the deterioration of TMR effect.

The tunnel barrier layer of the TMR multilayer 72 is made of, for example, $Al_2O_3$, NiO, GdO, MgO, $Ta_2O_5$, $MoO_2$, $TiO_2$ or $WO_2$. A thickness of the tunnel barrier layer is in the range of about 0.5 to 2 nm. In order to make a low-resistance element, the thickness of the tunnel barrier layer should be as small as possible. However, too thin layer is not desirable because it may cause pinholes which in turn cause leakage current.

The anti-ferromagnetic thin-film layer of the TMR multilayer 72 is made of, for example, PtMn or RuRhMn but other common anti-ferromagnetic materials may be used. A thickness is in the range of about 6 to 30 nm.

The insulation gap layer 76, the first insulation layer 77, and the second insulation layer 78 are usually made of $Al_2O_3$.

The first and second via hole conductors 79 and 83, the first, second and third lead conductors 80, 82 and 84, and the first and second terminal electrodes (connection pads) 81 and 85 are made of, for example, Cu, Al, Au or Ag. The second lead conductor 82, one end of which is electrically connected to the upper shield layer 74 may be formed of the same material as that of the upper shield layer 74.

An important aspect of this embodiment is that the second lead conductor 82 (and the upper gap layer 73 under the second lead conductor 82) formed on the lower shield layer 70 or the lower gap layer 71 has a narrower width than that of the conventional art. The conventional art will be described in this respect.

Figure 10:
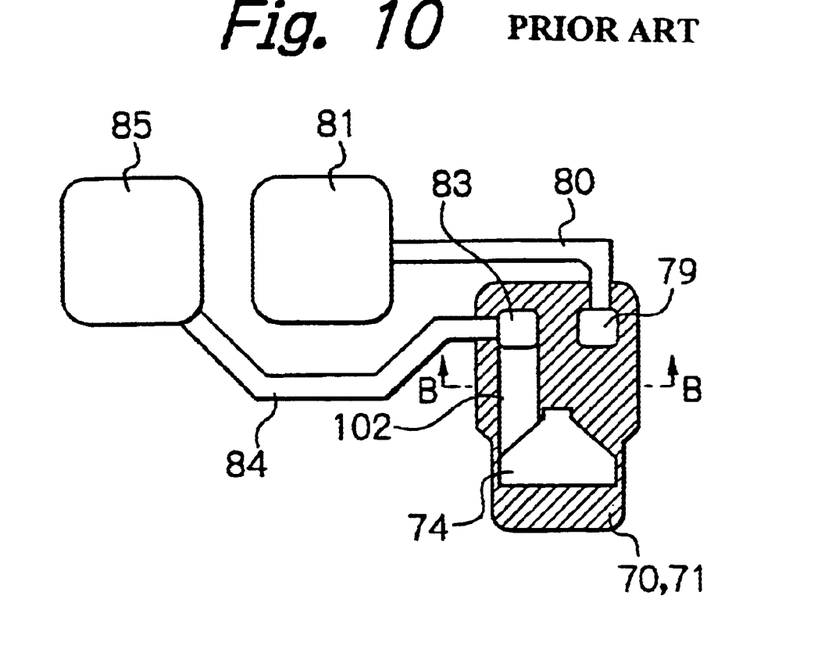
FIG. 10 shows a plane view schematically illustrating a configuration of a lower shield layer, an upper shield layer and lead conductors of a conventional TMR thin-film magnetic head.
Figure 11:
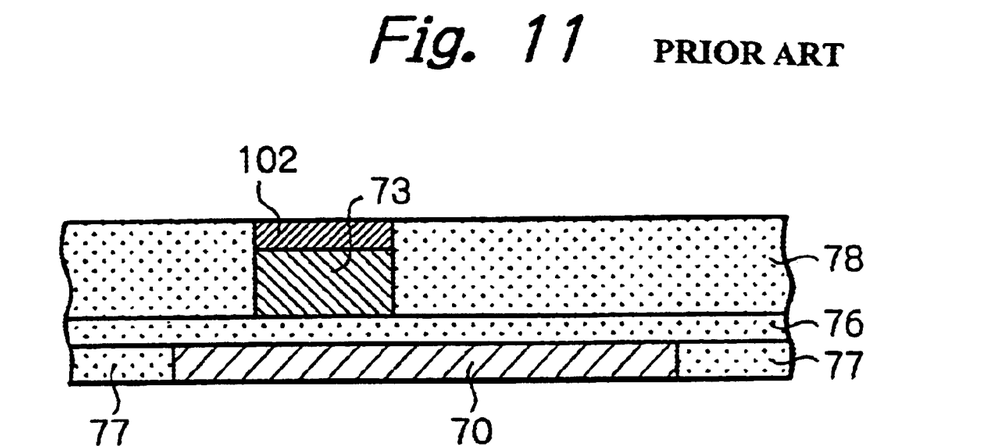
FIG. 11 shows an B—B line sectional view of FIG. 10.

FIG. 10 schematically illustrates an outline of the configuration of a lower shield layer, an upper shield layer, and lead conductors of a conventional TMR thin-film magnetic head before MR height or throat height polishing and FIG. 11 illustrates a B—B line section of FIG. 10. In these figures, elements similar to those in FIGS. 7 to 9 of the first embodiment are given the same reference numerals.

As shown in FIG. 10, in the conventional art, a second lead conductor 102 (and the upper gap layer 73 under the conductor 102), one end of which is electrically connected to the upper shield layer 74 and the other end of which is electrically connected to the second via hole conductor 83, has substantially the same width as that of the second via hole conductor 83.

Comparing FIGS. 7 and 9 with FIGS. 10 and 11, the second lead conductor 82 of the first embodiment has a much smaller width than that of the conventional art. Therefore, an area of conductor or electrode that has the potential of the upper shield layer 74 and opposes the lower shield layer 70 or the lower gap layer 71 is considerably small. Consequently, the capacitance $C_{shield}$ between the lower shield layer 70 and the upper shield layer 74 becomes smaller, greatly improving the frequency characteristic of the thin-film magnetic head.

In the first embodiment shown in FIG. 7, the area S of the conductor or electrode having the potential of the upper shield layer 74 and located above the lower shield layer 70 or the lower gap layer 71, in other words the area serving as electrode of a capacitance was S=7810 $\mu m^2$ (calculated by CAD). The capacitance $C_{shield}$ between the lower shield layer 70 and the upper shield layer 74 was $C_{shield}$=7.9 pF and the cutoff frequency fc was fc=154.9 MHz. The distance between the lower shield layer 70 and the upper shield layer 74 was 110 nm. Of which, the film thickness of the insulation layer formed of $Al_2O_3$ was 52 nm, and the resistance $R_{HGA}$ of the TMR head including the leads was $R_{HGA}$=130 Ω. The measured values and calculated values of the capacitance $C_{shield}$ and the cut-off frequency fc are in fairly good agreement. For example, the cut-off frequency fc can be calculated from fc=1/($2\pi R_{HGA} C_{shield}$).

The conventional art shown in FIG. 10 had S=10230 $\mu m^2$, $C_{shield}$=10.2 pF, and fc=120 MHz.

Figure 12:
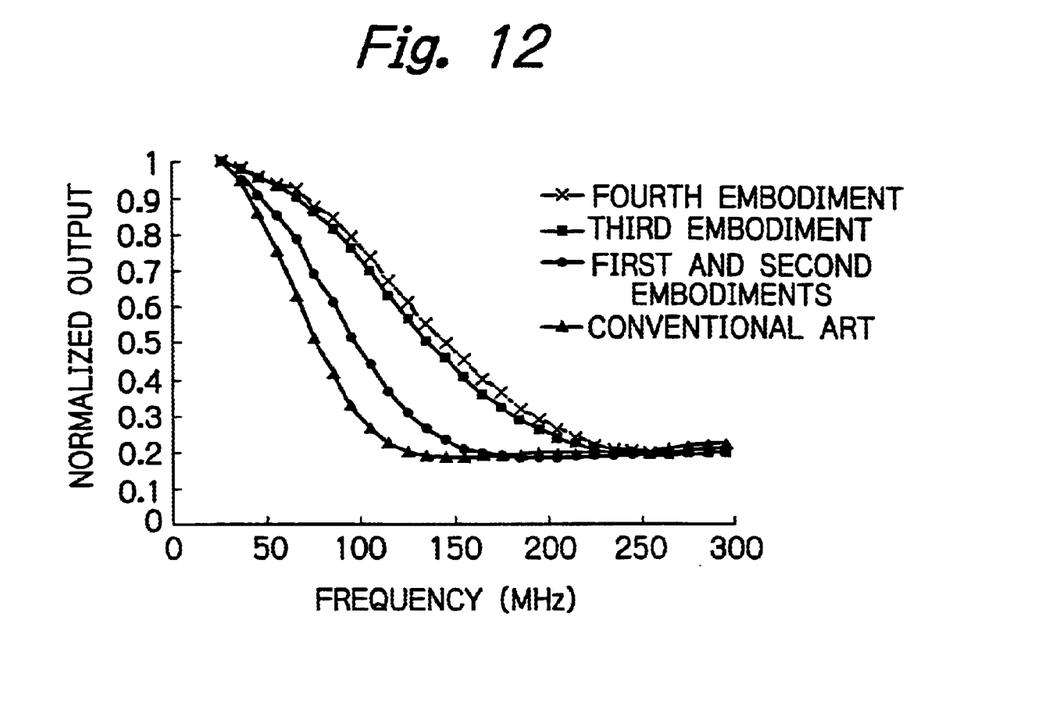
FIG. 12 illustrates measured head output versus frequency characteristics of actually fabricated TMR heads in the first to fourth embodiments according to the present invention and of the conventional TMR head.
Figure 13:
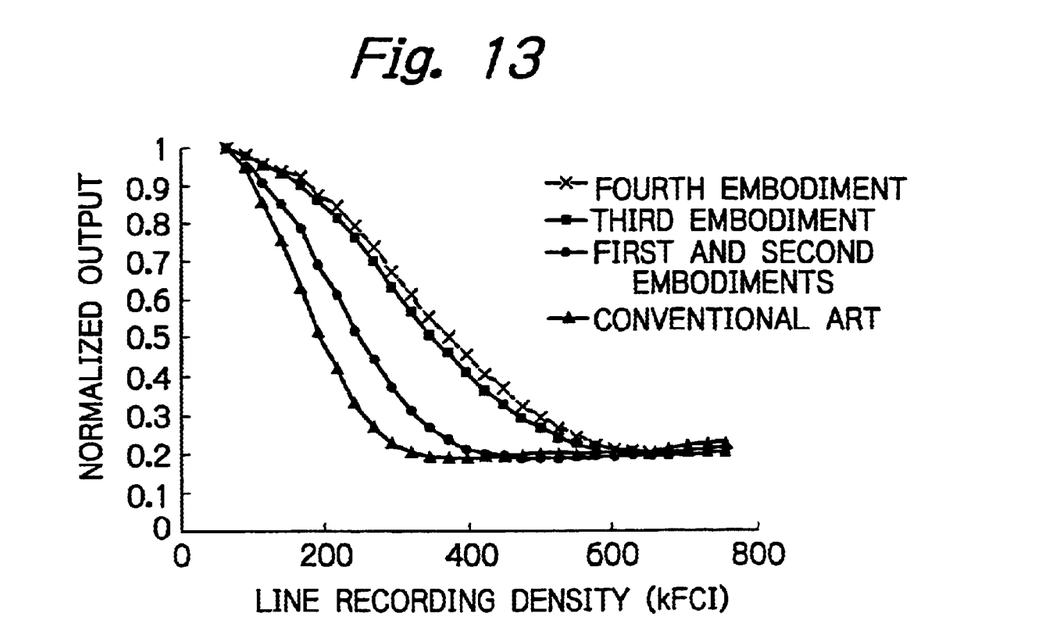
FIG. 13 illustrates calculated line recording density versus frequency characteristic derived from the characteristic shown in FIG. 12.

FIG. 12 illustrates measured head output versus frequency characteristics of actually fabricated TMR heads in the first to fourth embodiments according to the present invention and of the conventional TMR head, and FIG. 13 illustrates calculated line recording density versus frequency characteristic derived from the characteristic shown in FIG. 12.

Each actually fabricated TMR head sample had a TMR multilayer of a laminated structure of NiCr (3 nm) as an under layer, PtMn (14 nm) as an anti-ferromagnetic thin-film layer, CoFe (2 nm)/Ru (0.8 nm)/CoFe (2 nm) as a lower ferromagnetic thin-film layer (pinned layer), $AlO_X$ as a tunnel barrier layer, CoFe (2 nm)/NiFe (4 nm) as an upper ferromagnetic thin-film layer (free layer), and NiCr (3 nm) as a cap layer, all of which are sequentially laminated in this order. With respect to the TMR multilayer, a dimension was 0.35×0.35 $\mu m^2$, RA was 15 $\Omega \mu m^2$, the distance between the shield layers was 110 nm, the film thickness of the insulation material of $Al_2O_3$ was 52 nm, and the resistance of TMR head including leads was $R_{HGA}$=130 Ω. With a magnetic disk rotating at a speed of 5400 rpm, the frequency characteristic of the TMR head was tested with different recording frequencies, the test being carried out at a position of a radius r=35 mm.

As is apparent from FIGS. 12 and 13, the second lead conductor 82 of the first embodiment has a much smaller width than the conventional art second lead conductor 102, so that the capacitance $C_{shield}$ has decreased from $C_{shield}$=10.2 pF of the conventional art to 7.9 pF of the first embodiment. This improves the frequency characteristic of the head greatly. In addition, the D50 value has also improved greatly from 194 kFCI in the conventional art to 241 kFCI in the first embodiment.

Figure 14:
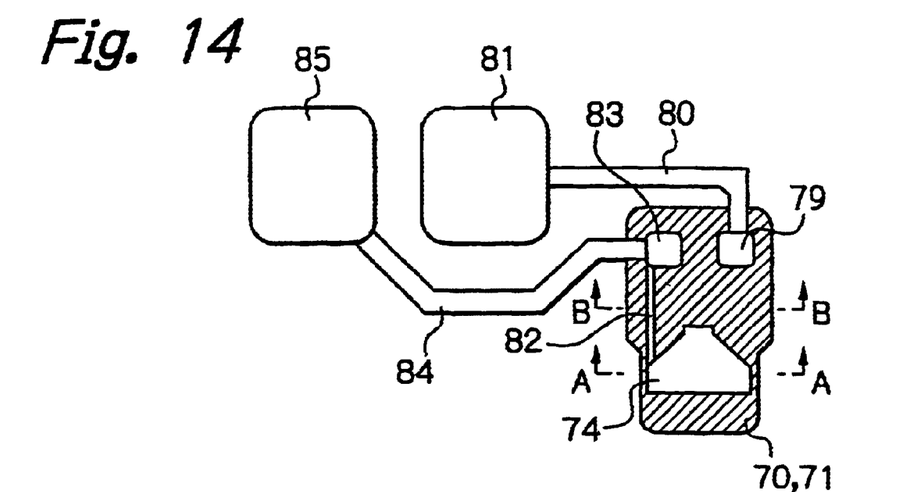
FIG. 14 shows a plane view schematically illustrating, as a second embodiment according to the present invention, a configuration of a lower shield layer, an upper shield layer and lead conductors of a TMR thin-film magnetic head.
Figure 15:
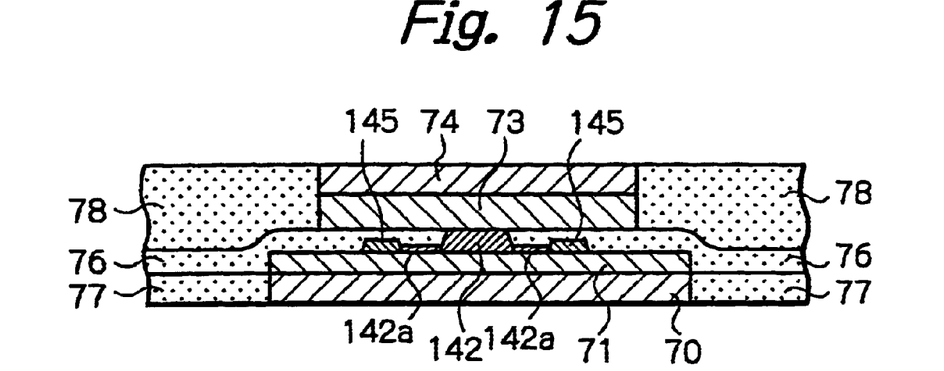
FIG. 15 shows an A—A line sectional view of FIG. 14.
Figure 16:
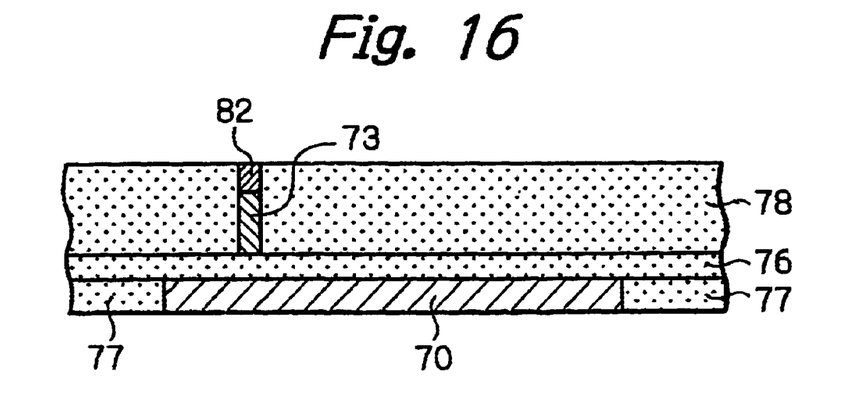
FIG. 16 shows a B—B line sectional view of FIG. 14.

FIG. 14 schematically illustrates an outline of the configuration of a lower shield layer, an upper shield layer, and lead conductors of a TMR thin-film magnetic head before MR height or throat height polishing as a second embodiment according to the present invention, FIG. 15 illustrates an A—A line section of FIG. 14, and FIG. 16 illustrates a B—B line section of FIG. 14.

In FIG. 14, only the lower shield layer, the upper shield layer, the lead conductors connected to the lower shield layer and upper shield layer, and terminal electrodes are shown, but the rest of the structure are omitted. In FIGS. 15 and 16, layers laminated on the upper surface of the upper shield layer are omitted.

This second embodiment differs from the first embodiment in the structure of TMR multilayer 142 and hard bias layers 145 that are patterned and formed on the lower gap layer 71. The other structure of the second embodiment is exactly the same as that of the first embodiment. Thus, in these figures, elements similar to those in FIGS. 7 to 9 of the first embodiment are given the same reference numerals.

The TMR head of the second embodiment has TMR multilayer 142 of multi-layered structure with basic layers of a lower ferromagnetic thin-film layer (free layer), a tunnel barrier layer, an upper ferromagnetic thin-film layer (pinned layer) and an anti-ferromagnetic thin-film layer, all of which are sequentially laminated in this order on the lower gap layer 71. The hard bias layers 145 are also laminated on the lower gap layer 71. Reference numeral 142a shown in FIG. 15 denotes extended parts of the lower ferromagnetic thin-film layer (free layer) extending from the TMR multilayer 142 to the hard bias layers 145 along the surfaces of layers of the TMR multilayer.

The other configuration, material, film thickness, effects and advantages, and modifications in the second embodiment are the same as those in the first embodiment.

Figure 17:
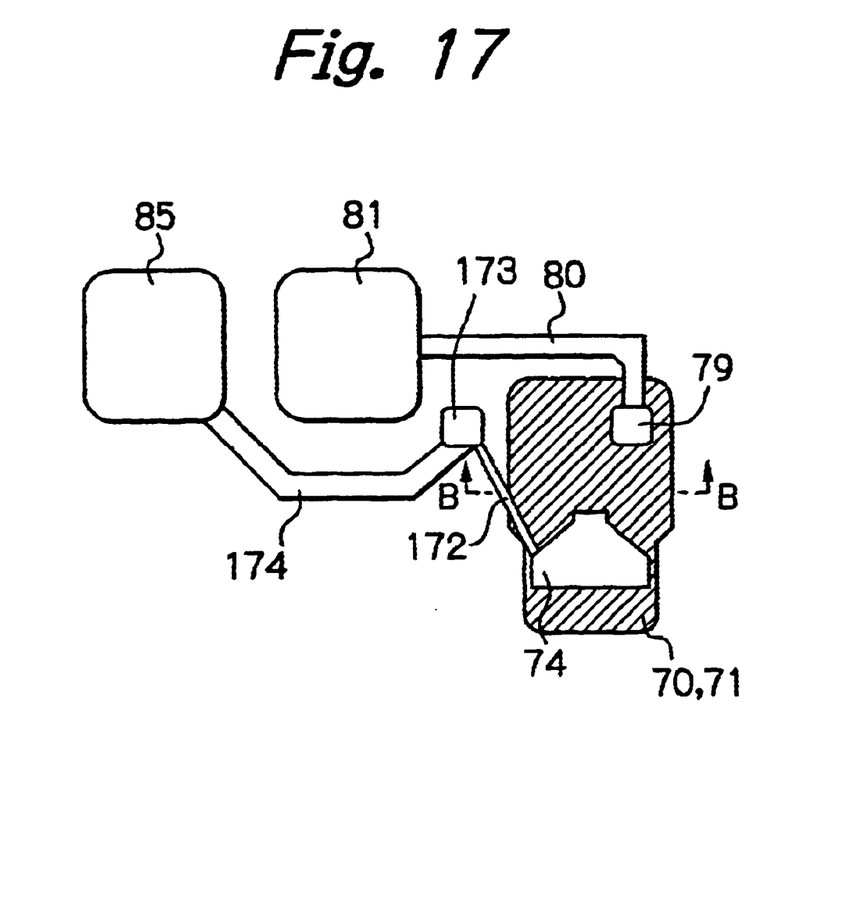
FIG. 17 shows a plane view schematically illustrating, as a third embodiment according to the present invention, a configuration of a lower shield layer, an upper shield layer and lead conductors of a TMR thin-film magnetic head.
Figure 18:
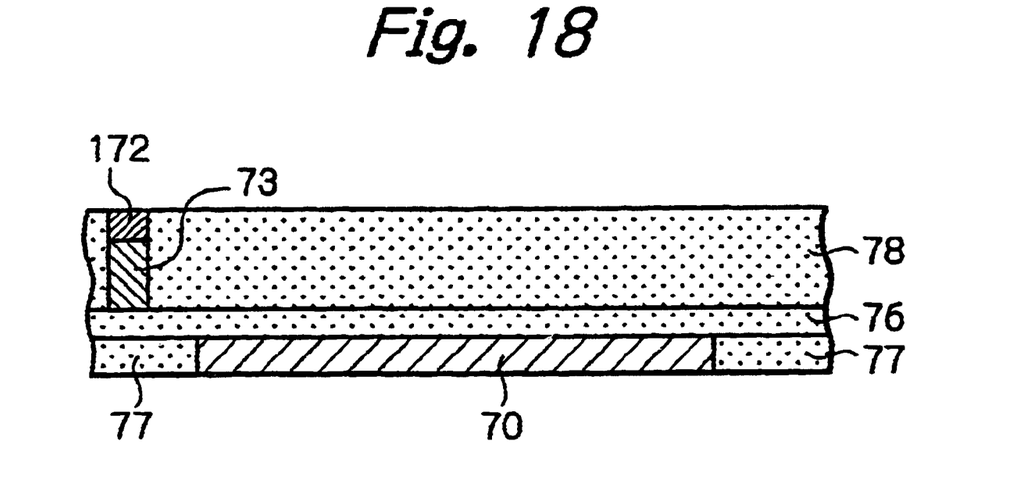
FIG. 18 shows a B—B line sectional view of FIG. 17.

FIG. 17 schematically illustrates an outline of the configuration of a lower shield layer, an upper shield layer, and lead conductors of a TMR thin-film magnetic head before MR height or throat height polishing as a third embodiment according to the present invention, and FIG. 18 illustrates a B—B line section of FIG. 17.

In FIG. 17, only the lower shield layer, the upper shield layer, the lead conductors connected to the lower shield layer and upper shield layer, and terminal electrodes are shown, but the rest of the structure are omitted. In FIG. 18, layers laminated on the upper surface of the upper shield layer are omitted.

This third embodiment differs from the first and second embodiments only in the structures of a second lead conductor 172, one end of which is electrically connected to the upper shield layer 74, a second via hole conductor 173, one end of which is electrically connected to the other end of the second lead conductor 172, and a third lead conductor 174, one end of which is electrically connected to the other end of the second via hole conductor 173. The other construction is exactly the same as the first and second embodiments. Thus, in these figures, elements similar to those in FIGS. 7 to 9 of the first embodiment are given the same reference numerals.

An important aspect of this embodiment is that the second via hole conductor 173 is formed outside of the lower shield layer 70. Further, the second lead conductor 172 (and the upper gap layer 73 under the second lead conductor 172) has a smaller width than that of the conventional art and forms a straight line that obliquely connects the upper shield layer 74 with the second via hole conductor 173. Therefore, an area of conductor or electrode that has the potential of the upper shield layer 74 and opposes the lower shield layer 70 or the lower gap layer 71 is considerably small. Consequently, the capacitance $C_{shield}$ between the lower shield layer 70 and the upper shield layer 74 becomes smaller, greatly improving the frequency characteristic of the thin-film magnetic head.

In the third embodiment shown in FIG. 17, the area S of the conductor or electrode having the potential of the upper shield layer 74 and located above the lower shield layer 70 or the lower gap layer 71, in other words the area serving as electrode of a capacitance was S=5880 $\mu m^2$ (calculated by CAD). The capacitance $C_{shield}$ between the lower shield layer 70 and the upper shield layer 74 was $C_{shield}$=5.9 pF and the cutoff frequency fc was fc=207 MHz. The distance between the lower shield layer 70 and the upper shield layer 74 was 110 nm. Of which, the film thickness of the insulation layer formed of $Al_2O_3$ was 52 nm, and the resistance $R_{HGA}$ of the TMR head including the leads was $R_{HGA}$=130 Ω. The measured values and calculated values of the capacitance $C_{shield}$ and the cut-off frequency fc are in fairly good agreement. For example, the cut-off frequency fc can be calculated from fc=1/($2\pi R_{HGA} C_{shield}$).

In the third embodiment, as aforementioned, the second via hole conductor 173 is formed outside of the lower shield layer 70, the second lead conductor 172 has a smaller width than that of the conventional art, and the second lead conductor 172 obliquely connects the upper shield layer 74 with the second via hole conductor 173. Thus, as is apparent from FIGS. 12 and 13, the capacitance $C_{shield}$ has decreased from $C_{shield}$=10.2 pF of the conventional art to 5.9 pF in the third embodiment. This improves the frequency characteristic of the head greatly. In addition, the D50 value has also improved greatly from 194 kFCI in the conventional art to 345 kFCI in the third embodiment.

The other configuration, material, film thickness, effects and advantages, and modifications of the third embodiment are the same as those of the first and second embodiments.

Figure 19:
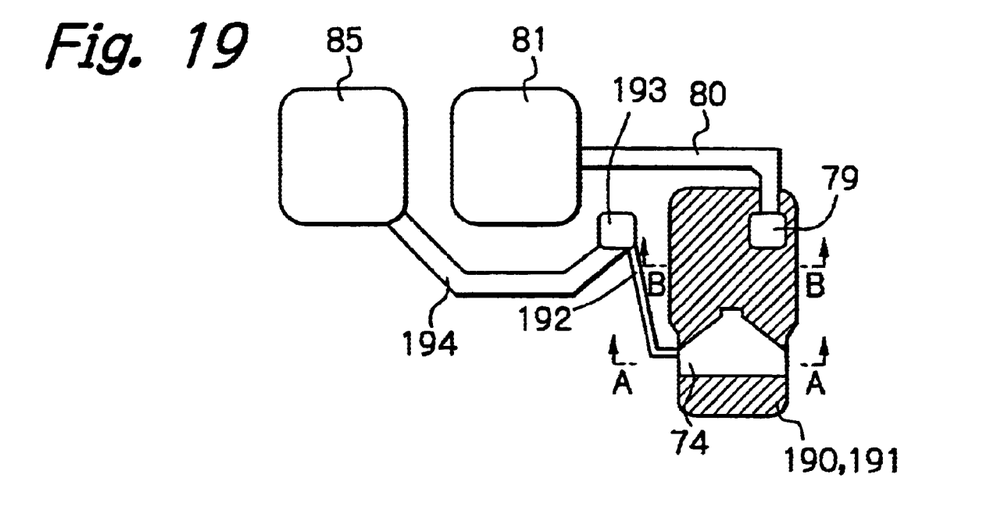
FIG. 19 shows a plane view schematically illustrating, as a fourth embodiment according to the present invention, a configuration of a lower shield layer, an upper shield layer and lead conductors of a TMR thin-film magnetic head.
Figure 20:
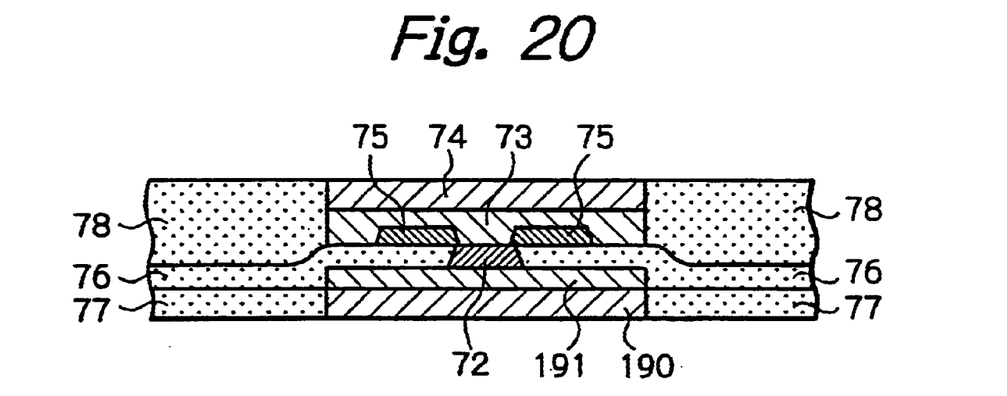
FIG. 20 shows an A—A line sectional view of FIG. 19.
Figure 21:
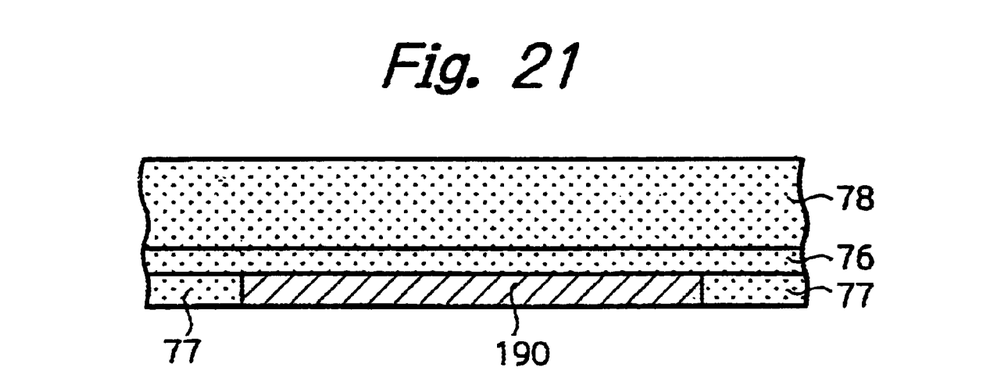
FIG. 21 shows a B—B line sectional view of FIG. 19.

FIG. 19 schematically illustrates an outline of the configuration of a lower shield layer, an upper shield layer, and lead conductors of a TMR thin-film magnetic head before MR height or throat height polishing as a fourth embodiment according to the present invention, FIG. 20 illustrates an A—A line section of FIG. 19, and FIG. 21 illustrates a B—B line section of FIG. 19.

In FIG. 19, only the lower shield layer, the upper shield layer, the lead conductors connected to the lower shield layer and upper shield layer, and terminal electrodes are shown, but the rest of the structure are omitted. In FIGS. 20 and 21, layers laminated on the upper surface of the upper shield layer are omitted.

This fourth embodiment differs from the first and second embodiments that a portion of the lower shield layer 190 or the lower gap layer 191 that overlaps the upper shield layer 74 has a somewhat smaller width than the conventional art such that the width is substantially the same as that of the upper shield layer 74. Also, this fourth embodiment differs in the structures of a second lead conductor 192, one end of which is electrically connected to the upper shield layer 74, a second via hole conductor 193, one end of which is electrically connected to the other end of the second lead conductor 192, and a third lead conductor 194, one end of which is electrically connected to the other end of the second via hole conductor 193. The other construction is exactly the same as those of the first and second embodiments. Thus, in these figures, elements similar to those in FIGS. 7 to 9 of the first embodiment and FIGS. 14–16 of the second embodiment are given the same reference numerals.

An important aspect of the fourth embodiment is that the second via hole conductor 193 is formed outside of the lower shield layer 190 and the second lead conductor 192 is formed in its entirety outside of the lower shield layer 190. Therefore, an area of conductor or electrode that has the potential of the upper shield layer 74 and opposes the lower shield layer 190 or the lower gap layer 191 is considerably small. Consequently, the capacitance $C_{shield}$ between the lower shield layer 190 and the upper shield layer 74 becomes smaller, greatly improving the frequency characteristic of the thin-film magnetic head.

In the fourth embodiment shown in FIG. 19, the area S of the conductor or electrode having the potential of the upper shield layer 74 and located above the lower shield layer 190 or the lower gap layer 191, in other words the area serving as electrode of a capacitance was S=5510 $\mu m^2$ (calculated by CAD). The capacitance $C_{shield}$ between the lower shield layer 190 and the upper shield layer 74 was $C_{shield}$=5.5 pF and the cut-off frequency fc was fc=223 MHz. The distance between the lower shield layer 190 and the upper shield layer 74 was 110 nm. Of which, the film thickness of the insulation layer formed of $Al_2O_3$ was 52 nm, and the resistance $R_{HGA}$ of the TMR head including the leads was $R_{HGA}$=130 Ω. The measured values and calculated values of the capacitance $C_{shield}$ and the cut-off frequency fc are in fairly good agreement. For example, the cut-off frequency fc can be calculated from fc=1/($2\pi R_{HGA} C_{shield}$).

In the fourth embodiment, not only the second via hole conductor 193 but also the entirety of the second lead conductor 192 for connecting the upper shield layer 74 with the second via hole conductor 193 are formed outside of the lower shield layer 190 together. Thus, the capacitance $C_{shield}$ has decreased from $C_{shield}$=10.2 pF of the conventional art to 5.5 pF in the fourth embodiment as is clear from FIGS. 12 and 13. This improves the frequency characteristic of the head greatly. The D50 value is also improved greatly from 194 kFCI in the conventional art to 368 kFCI in the fourth embodiment.

The other configuration, material, film thickness, effects and advantages, and modifications of the fourth embodiment are the same as those of the first and second embodiments.

In the aforementioned first to fourth embodiments, the insulation gap layer 76 is made of $Al_2O_3$. In modification, however, a part of or entirety of this insulation gap layer may be made of an insulation materials such as $Si_3N_4$, Co-$\gamma Fe_2O_3$ (hematite) or $SiO_2$ that has a lower dielectric constant than $Al_2O_3$, so that the capacitance $C_{shield}$ between the shield layers is further reduced to improve the frequency characteristics of the thin-film magnetic head.

Further, the insulation gap layer 76 may have a larger film thickness than that in the aforementioned first to fourth embodiments. This can be realized by increasing the film thickness of the TRM multilayer 72 or 142 itself, or by increasing the film thickness of the lower gap layer 71 only within a region of the TMR multilayer 72 or 142. Thus, the capacitance between the shield layers can be more reduced and the frequency characteristic of the thin-film magnetic head can be improved.

Still further, a distance between the lower shield layer and the upper shield layer can be substantially increased from that in the aforementioned first to fourth embodiments to further reduce the capacitance $C_{shield}$ between the shield layers and thus to improve the frequency characteristic of the thin-film magnetic head. This can be realized by removing the upper surface portion of the lower shield layer 70 or 190 to form a recess within a region where the TMR multilayer 72 or 142 is absent and by filling the recess with an insulation layer, or by partially adding an insulation layer on the insulation gap layer 76.

While the aforementioned embodiments have been described with respect to two types of TMR multilayer, the present invention can be applied to TMR elements with any structures. The present invention is similarly applicable to not only TMR heads but also CPP-GMR heads that employ CPP-GMR elements in which a sense current flows in a direction perpendicular to the surfaces of layers.

Many widely different embodiments of the present invention may be constructed without departing from the spirit and scope of the present invention. It should be understood that the present invention is not limited to the specific embodiments described in the specification, except as defined in the appended claims.

What is claimed is:

1. A magnetoresistive effect thin-film magnetic head, comprising:
   a lower shield layer;
   an upper shield layer;
   a magnetoresistive effect multilayer in which a current flows in a direction perpendicular to surfaces of layers of said magnetoresistive effect multilayer, said magnetoresistive effect multilayer being formed between said lower shield layer and said upper shield layer, and being electrically connected with said lower shield layer and said upper shield layer; and
   a lead conductor provided with one end electrically connected to said upper shield layer and the other end electrically connected to a terminal electrode,
   said lead conductor includes a via hole conductor and said lead conductor being patterned such that a width of said lead conductor located above said lower shield layer is smaller than a width of said via hole conductor.

2. The magnetoresistive effect thin-film magnetic head as claimed in claim 1, wherein said via hole conductor is formed outside of said lower shield layer.

3. The magnetoresistive effect thin-film magnetic head as claimed in claim 1, wherein whole of said lead conductor is located outside of said lower shield layer.

4. The magnetoresistive effect thin-film magnetic head as claimed in claim 1, wherein said magnetoresistive effect multilayer is a tunnel magnetoresistive effect multilayer including a tunnel barrier layer and a pair of ferromagnetic thin-film layers between which said tunnel barrier layer is sandwiched.

5. The magnetoresistive effect thin-film magnetic head as claimed in claim 1, wherein said magnetoresistive effect multilayer is a current perpendicular to the plane giant magnetoresistive effect multilayer including a nonmagnetic metal layer, and a pair of ferromagnetic thin-film layers between which said nonmagnetic metal layer is sandwiched.

6. A magnetoresistive effect thin-film magnetic head, comprising:
   a lower shield layer;
   a lower gap layer made of a nonmagnetic electrically conductive material and laminated on said lower shield layer;
   a magnetoresistive effect multilayer in which a current flows in a direction perpendicular to surfaces of layers of said magnetoresistive effect multilayer, said magnetoresistive effect multilayer being laminated on said lower gap layer;
   an upper gap layer made of a nonmagnetic electrically conductive material and laminated on said magnetoresistive effect multilayer;
   an insulation gap layer made of an insulation material and formed around said magnetoresistive effect multilayer and said upper gap layer;
   an upper shield layer laminated on said upper gap layer and said insulation gap layer;
   a lead conductor provided with one end electrically connected to said lower shield layer; and
   a terminal electrode electrically connected to the other end of said lead conductor,
   said lead conductor includes a via hole conductor and said lead conductor being patterned such that a width of said lead conductor located above said lower shield layer is smaller than a width of said via hole conductor.

7. The magnetoresistive effect thin-film magnetic head as claimed in claim 6, wherein said via hole conductor is formed outside of said lower shield layer.

8. The magnetoresistive effect thin-film magnetic head as claimed in claim 6, wherein whole of said lead conductor is located outside of said lower shield layer.

9. The magnetoresistive effect thin-film magnetic head as claimed in claim 6, wherein said magnetoresistive effect multilayer is a tunnel magnetoresistive effect multilayer including a tunnel barrier layer and a pair of ferromagnetic thin-film layers between which said tunnel barrier layer is sandwiched.

10. The magnetoresistive effect thin-film magnetic head as claimed in claim 6, wherein said magnetoresistive effect multilayer is a current perpendicular to the plane giant magnetoresistive effect multilayer including a nonmagnetic metal layer, and a pair of ferromagnetic thin-film layers between which said nonmagnetic metal layer is sandwiched.

11. A magnetoresistive effect thin-film magnetic head, comprising:
   a lower shield layer;
   an upper shield layer;
   a magnetoresistive effect multilayer in which a current flows in a direction perpendicular to surfaces of layers of said magnetoresistive effect multilayer, said magnetoresistive effect multilayer being formed between said lower shield layer and said upper shield layer, and being electrically connected with said lower shield layer and said upper shield layer; and
   a lead conductor provided with one end electrically connected to said upper shield layer and the other end electrically connected to a terminal electrode, whole of said lead conductor being located outside of said lower shield layer so that an area of said lead conductor located above said lower shield layer becomes small.

12. The magnetoresistive effect thin-film magnetic head as claimed in claim 11, wherein said magnetoresistive effect multilayer is a tunnel magnetoresistive effect multilayer including a tunnel barrier layer and a pair of ferromagnetic thin-film layers between which said tunnel barrier layer is sandwiched.

13. The magnetoresistive effect thin-film magnetic head as claimed in claim 11, wherein said magnetoresistive effect multilayer is a current perpendicular to the plane giant magnetoresistive effect multilayer including a nonmagnetic metal layer, and a pair of ferromagnetic thin-film layers between which said nonmagnetic metal layer is sandwiched.

14. A magnetoresistive effect thin-film magnetic head, comprising:

a lower shield layer;

a lower gap layer made of a nonmagnetic electrically conductive material and laminated on said lower shield layer;

a magnetoresistive effect multilayer in which a current flows in a direction perpendicular to surfaces of layers of said magnetoresistive effect multilayer, said magnetoresistive effect multilayer being laminated on said lower gap layer;

an upper gap layer made of a nonmagnetic electrically conductive material and laminated on said magnetoresistive effect multilayer;

an insulation gap layer made of an insulation material and formed around said magnetoresistive effect multilayer and said upper gap layer;

an upper shield layer laminated on said upper gap layer and said insulation gap layer;

a lead conductor provided with one end electrically connected to said lower shield layer; and a terminal electrode electrically connected to the other end of said lead conductor, whole of said lead conductor being located outside of said lower shield layer so that an area of said lead conductor located above sad lower shield layer becomes small.

15. The magnetoresistive effect thin-film magnetic head as claimed in claim 14, wherein said magnetoresistive effect multilayer is a tunnel magnetoresistive effect multilayer including a tunnel barrier layer and a pair of ferromagnetic thin-film layers between which said tunnel barrier layer is sandwiched.

16. The magnetoresistive effect thin-film magnetic head as claimed in claim 14, wherein said magnetoresistive effect multilayer is a current perpendicular to the plane giant magnetoresistive effect multilayer including a nonmagentic metal layer, and a pair of ferromagnetic thin-film layers between which said nonmagnetic metal layer is sandwiched.

* * * * *